United States Patent
Winfree et al.

(10) Patent No.: US 7,706,213 B2
(45) Date of Patent: Apr. 27, 2010

(54) MECHANICAL FILTER FOR SENSORS

(76) Inventors: Nancy Ann Winfree, 12111 Ranchitos Rd., NE., Albuquerque, NM (US) 87122-2320; Joseph Hyunchul Kang, 12111 Ranchitos Rd., NE., Albuquerque, NM (US) 87122-2320

( * ) Notice: Subject to any disclaimer, the term of this patent is extended or adjusted under 35 U.S.C. 154(b) by 0 days.

(21) Appl. No.: 11/977,032

(22) Filed: Oct. 23, 2007

(65) Prior Publication Data
US 2008/0136564 A1 Jun. 12, 2008

Related U.S. Application Data

(60) Provisional application No. 60/853,577, filed on Oct. 23, 2006.

(51) Int. Cl.
*G10K 11/16* (2006.01)
(52) U.S. Cl. .................. 367/173
(58) Field of Classification Search ........... 367/176, 367/1, 152, 162, 165, 173; 310/326, 327
See application file for complete search history.

(56) References Cited

U.S. PATENT DOCUMENTS

| | | | | |
|---|---|---|---|---|
| 2,994,400 | A * | 8/1961 | Heller | 367/1 |
| 4,522,890 | A | 6/1985 | Volkers et al. | |
| 4,627,114 | A | 12/1986 | Mitchell | |
| 4,759,000 | A * | 7/1988 | Reitz | 367/176 |
| 5,022,307 | A | 6/1991 | Gibbons, Jr. et al. | |
| 5,245,586 | A * | 9/1993 | Hassler | 367/12 |
| 5,312,675 | A | 5/1994 | Cooper et al. | |
| 5,783,297 | A | 7/1998 | Wise et al. | |
| 6,123,171 | A | 9/2000 | McNett et al. | |
| 6,129,327 | A | 10/2000 | Dubois | |
| 6,174,587 | B1 | 1/2001 | Figge, Sr. | |
| 6,199,801 | B1 | 3/2001 | Wilke et al. | |
| 6,202,961 | B1 | 3/2001 | Wilke et al. | |
| 6,290,183 | B1 | 9/2001 | Johnson et al. | |
| 6,535,458 | B2 | 3/2003 | Meehan | |
| 6,712,318 | B2 | 3/2004 | Gubert et al. | |
| 6,791,470 | B1 | 9/2004 | Drumheller | |
| 6,943,647 | B2 * | 9/2005 | Aigner et al. | 310/327 |

(Continued)

OTHER PUBLICATIONS

Bateman, Brown & Nusser, High shock, high frequency characteristics of a mechanical isolator for a piezoresistive accelerometer, the ENDEVCO 7270AM6, Jul. 2000, Sandia National Laboratories Technical Report SAND2000-1528, USA.

(Continued)

*Primary Examiner*—Dan Pihulic
(74) *Attorney, Agent, or Firm*—Rod D. Baker (57) ABSTRACT

An arrangement of material layers designed and utilized as a filter to mechanical waves entering a sensor. To isolate the sensor, the filter can be designed to attenuate specified frequencies that could propagate from the environment and into the sensor. Provided there is a difference in the mechanical impedance between the environment and the sensor case, then a filter can be designed to amplify a specified range of frequencies, enhancing the coupling of the sensor to its environment. The filters work by altering the transmission and reflection of incident waves. Dissipative mechanisms are not required. Test data is included that demonstrates the effectiveness of layered isolation mounts developed to block inputs that would excite the resonance frequency an accelerometer's seismic mass.

20 Claims, 10 Drawing Sheets

U.S. PATENT DOCUMENTS

2004/0174772 A1* 9/2004 Jones .................. 367/152
2008/0136564 A1* 6/2008 Winfree et al. .............. 333/186

OTHER PUBLICATIONS

Sackman, Kelly & Javid, "A layered notch filter for high-frequency dynamic isolation," Journal of Pressure Vessel Technology, Feb. 1989, vol. 111, pp. 17-23, Transactions of the ASME, USA.

Bruel & Kjaer, Product data sheet for UA 0553 and UA 0559, "Mechanical Filter for Accelerometers." Downloaded Oct. 23, 2007 from http://www.bksv.com/pdf/Bp0297.pdf.

Cooper, Townend, Cater & Pearce, The role of stress waves in thoracic visceral injury from blast loading: Modification of stress transmission by foams and high-density materials, Journal of Biomechanics, 1991, vol. 24, No. 5, pp. 273-285.

Sackman, J.L. et al., "A Layered Notch Filter for High-Frequency Isolation"; Proceedings of the Second Vibration Damping Workshop, Las Vegas, NV, Mar. 5-7, 1986.

Bateman, V.I. et al; "Eval. of Shock Isolation Techniques . . . "; Proc. of the 60th Shock and Vibration Symp., Virginia Beach, VA, Nov. 14-16, 1989.

Bateman, V.I. et al. "Eval. of Uniaxial and Triaxial Shock Isolation . . . "; Proc. of the 61st Shock and Vibration Symp., Pasadena, CA, Oct. 16-18, 1990.

Drumheller, D.; "Extensional Stress Waves in One-Dimensional Elastic Waveguides"; J. Acoust. Soc. Am., vol. 92, No. 6, Dec. 1992.

Bateman, V.I. et al., "High Shock, High Freq. Charac. of a Mech. Isolator . . . "; Proc. of 18th Transducer Workshop, Colorado Springs, CO, Jun. 20-22, 1995.

Bateman, V.I. et al.; "A Study of Shock Mitigating Mat. in a Split Hopkinson Bar . . . " Sandia Report SAND96-1437; Sandia Nat'l Labs., Jun. 1998.

Bateman, V.I. et al.; "A Study of Shock Mitigating Mat. in a Split Hopkinson Bar . . . " Sandia Report SAND97-1445; Sandia Nat'l Labs., Aug. 1998.

Carcione, J., et al.; "Simulation of Stress Waves in Attenuating Drill Strings . . . "; J. Acoust. Soc. Am., vol. 108, No. 1, Jul. 2000.

Endevco Corporation, "Piezoresistive Accelerometer Model 7270AM6," brochure (1 page), date unknown, Endevco Corp., published USA.

Chu, A.S., "Technical Paper 308—Problems in High-Shock Measurement" (8 pages), date unknown, Endevco Corporation, published San Suan Capistrano, CA, USA.

Endevco Corporation, "Isotron Accelerometer Model 7255A-01," brochure (2 pages), date unknown, Endevco Corporation, published San Suan Capistrano, CA, USA.

Walton, W. S., "Pyroshock Evaluation of Ballistic Shock Measurement Techniques," SAVIAC Proceedings of the 62nd Shock and Vibration Symposium, Oct. 29, 1991, pp. 422-432.

* cited by examiner

MECHANICAL FILTER FOR SENSORS

RELATED APPLICATIONS

Priority is claimed to provisional application of Winfree et al for Device to Isolate Sensors from Shock and Vibration filed on Oct. 23, 2006 having application No. 60/853,577.

FEDERALLY SPONSORED RESEARCH

The Federal Government has rights to this invention pursuant to Contract Number F08630-01-C-0021 awarded by the U.S. Air Force.

BACKGROUND OF THE INVENTION

1. Technical Field of the Invention

The present invention relates to the protection of sensors from mechanical shock, vibration, and impact, and to the enhancement of a sensor's response by improving its coupling to the environment.

2. Description of the Prior Art

A mechanical isolator for an accelerometer is described in the Sandia National Laboratories technical report number SAND2000-1528, entitled "High Shock, High Frequency Characteristics of a Mechanical Isolator for a Piezoresistive Accelerometer, the ENDEVCO 7270AM6" by Bateman, Brown and Nusser (2000). This device has two metal plates that, when held together by screws, clamp the accelerometer between them. Between each plate and the accelerometer is a thin sheet of a polysulfide elastomer to provide the isolation. The isolator's mass is about 7 grams, compared with 1.5 grams for the accelerometer.

This reference is deficient with respect to the present invention in that it is massive and bulky, and it relies upon an elastomer for the isolation. In some situations, elastomers and other dissipative materials are unsuitable because their stress-strain behavior is non-linear, as well as frequency dependent and temperature dependent. Elastomers may also be unsuitable because they degrade with time, and some react chemically with the environment.

The use of periodically layered media for isolation is described by Sackman, Kelly and Javid in "A layered notch filter for high-frequency dynamic isolation," Journal of Pressure Vessel Technology, February 1989, Vol. 111, pages 17-24. They present a mathematical analysis of the propagation of elastic waves through a periodic or repeating arrangement of two alternating layers. Experiments demonstrate the validity of the concept.

This reference is deficient with respect to the present invention in that only repeating arrangements of materials are considered.

The company Brüel and Kjaer markets "mechanical filters for accelerometers," which are described in Brüel and Kjaer product data sheet for parts UA 0553 and UA 0559. These filters are interposed between an accelerometer and the object to which it is mounted in order to prevent the accelerometer from detecting high frequency vibration. The filter is comprised of upper and lower steel parts bonded together with a butyl rubber core. The butyl rubber is the filter medium.

This reference is deficient with respect to the present invention in that it relies upon an elastomer for filtering. The stiffness and damping effect of the butyl rubber depends upon temperature, with optimum damping at ambient temperatures of 20 to 50 degrees Celsius. At higher temperatures the stiffness and damping of the rubber are reduced, while at lower temperatures the stiffness and damping of the rubber are increased.

In U.S. Pat. No. 5,312,675, Cooper et al described an article of protective clothing to protect against blast. The clothing has two sheets of material, chosen so that they have an acoustic decoupling effect which reduces the pressure wave effect on the body of a person wearing the clothing. The design approach is similar to the one used in the current application, in that the garment's layers are chosen specifically so that they will alter the mechanical wave transmitted through them and into the body in a specified manner. The approach is described in greater detail by the authors and a colleague in "The role of stress waves in thoracic visceral injury from blast loading: modification of stress transmission by foams and high-density materials," Journal of Biomechanics, Volume 24, Number 5, 1991, by G. J. Cooper et al.

This reference is deficient with respect to the present invention in that it is not applicable to the end use application intended for the present invention.

SUMMARY OF THE INVENTION

The invention is a structure of one or multiple layers of material placed between a sensor and its environment. The structure is designed and used as a filter to selectively transmit, attenuate, or amplify various frequencies of incident elastic waves that would otherwise propagate from the environment and into the sensor.

It is an object of the present invention to enable the isolation of a sensor from incident frequencies that may excite its resonance, damage it, or for some other reason be undesirable.

It is another object of the present invention that the isolation can be achieved without elastomers or other dissipative materials or dissipative mechanisms.

It is another object of the present invention that, rather than isolating the sensor, the coupling of the sensor to the environment may be enhanced, in that waves transmitted from the environment into the sensor can be amplified at selected frequencies.

It is another object of the present invention that the invention can be applied to sensors including but not limited to accelerometers, pressure sensors, force gages, and gyroscopes.

Thus the advantages of the present invention will become apparent to those skilled in this art by carefully reviewing this application, including the claims and the drawings.

DETAILED DESCRIPTION OF THE PRESENT INVENTION

The present invention is composed of one or more layers of material between a sensor and its environment. The design of the invention is accomplished by utilizing theories that model the transmission of mechanical waves through layered media. The present invention alters the transmission and reflection of the incident wave as a function of frequency in a very novel way.

The theories that are used to design the invention are well described in the literature. In the simplest form of the theory, a one-dimensional mechanical wave is considered to propagate from the environment into the sensor, partially transmitting and partially reflecting at the interface between the environment and the sensor. The wave may be a bulk longitudinal wave, a bulk shear wave, or it may be adequately described as a bar wave. The present invention alters the transmission and reflection of the incident wave as a function of frequency. The design approach is conceptually similar to that of creating optical filters with thin films.

The incident wave is decomposed into its harmonic components by Fourier decomposition. Then, the problem is formulated for a harmonic incident wave of circular frequency f. The relevant material properties are the wave speed c for the type of wave under consideration and the characteristic material impedance $Z=\rho c$, where $\rho$ is the density of the material. The wavelength of a harmonic wave of frequency f in a material with wave speed c is $\lambda=c/f$. A "quarter-wave length" is $\lambda/4$, and a "half-wave length" is $\lambda/2$.

If there are adjacent layers of identical materials, they can be considered to be one layer of material in the analysis, with a thickness equal to the sum of the individual layer thicknesses.

Embodiment Having a Single Layer of Material

Figure 1:
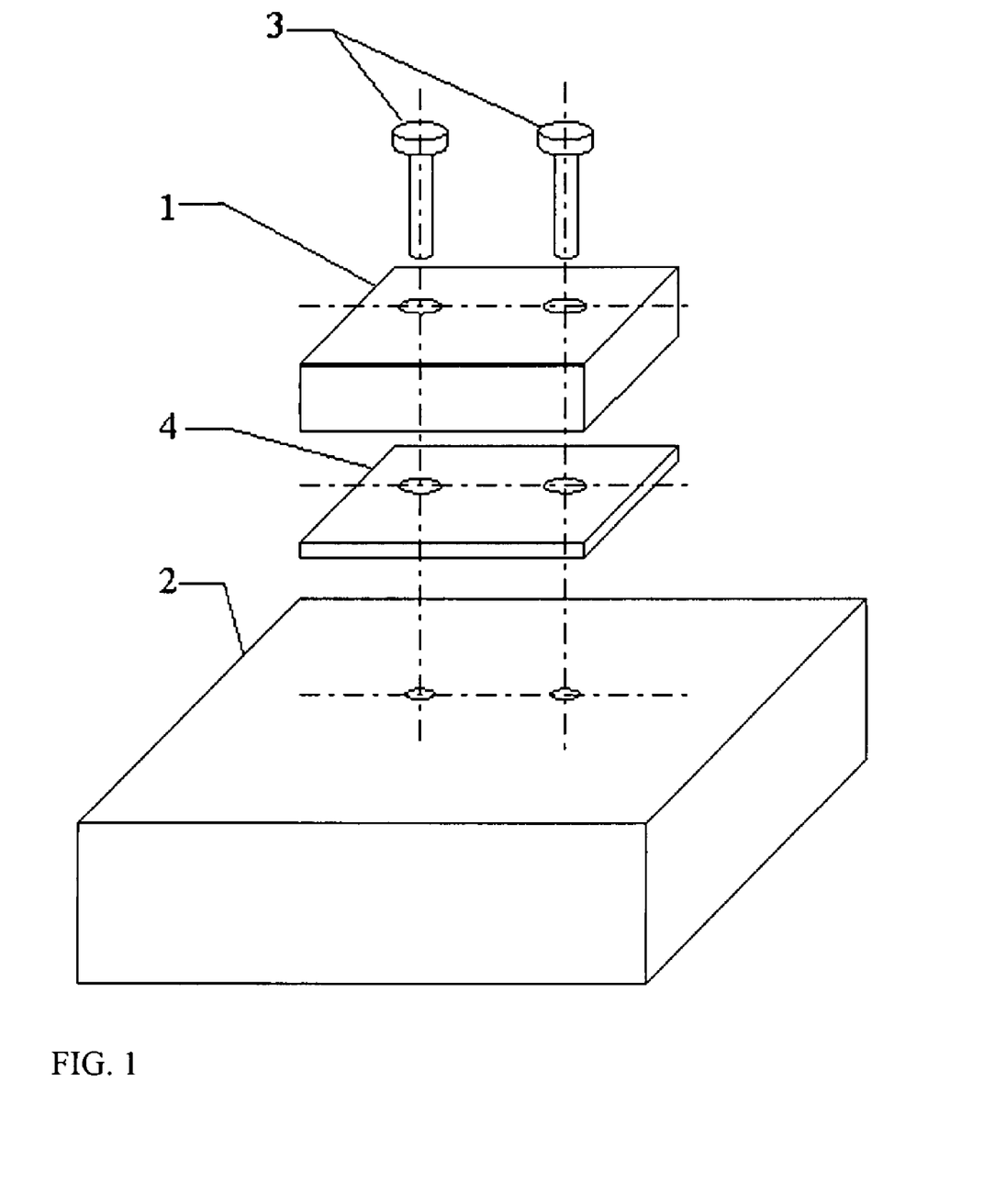
FIG. 1 illustrates a preferred embodiment in which the invention consists of a single layer between a sensor and a mounting surface.

The embodiment of FIG. 1 is composed of a single layer of material between a sensor and a surface to which it is mounted. In this embodiment of the invention, it is desired to alter the transmission of frequencies into the sensor near some critical frequency $f_c$.

If a layer material is chosen whose characteristic material impedance is intermediate to those of the sensor case and the mounting surface, then waves transmitted into the sensor can be amplified. In fact, if the layer's impedance is the geometric mean of the impedances of the other two materials, then there will be full transmission of frequency components for which the layer is a quarter of a wavelength thick, with no reflection back into the mounting surface.

If a layer material is chosen whose characteristic material impedance is either greater than or less than that of both the case and the mounting surface, then waves transmitted into the sensor can be attenuated. The magnitude of the attenuation increases as the impedance of the layer's material becomes increasingly disparate from those of the case and mounting surface.

Figure 2:
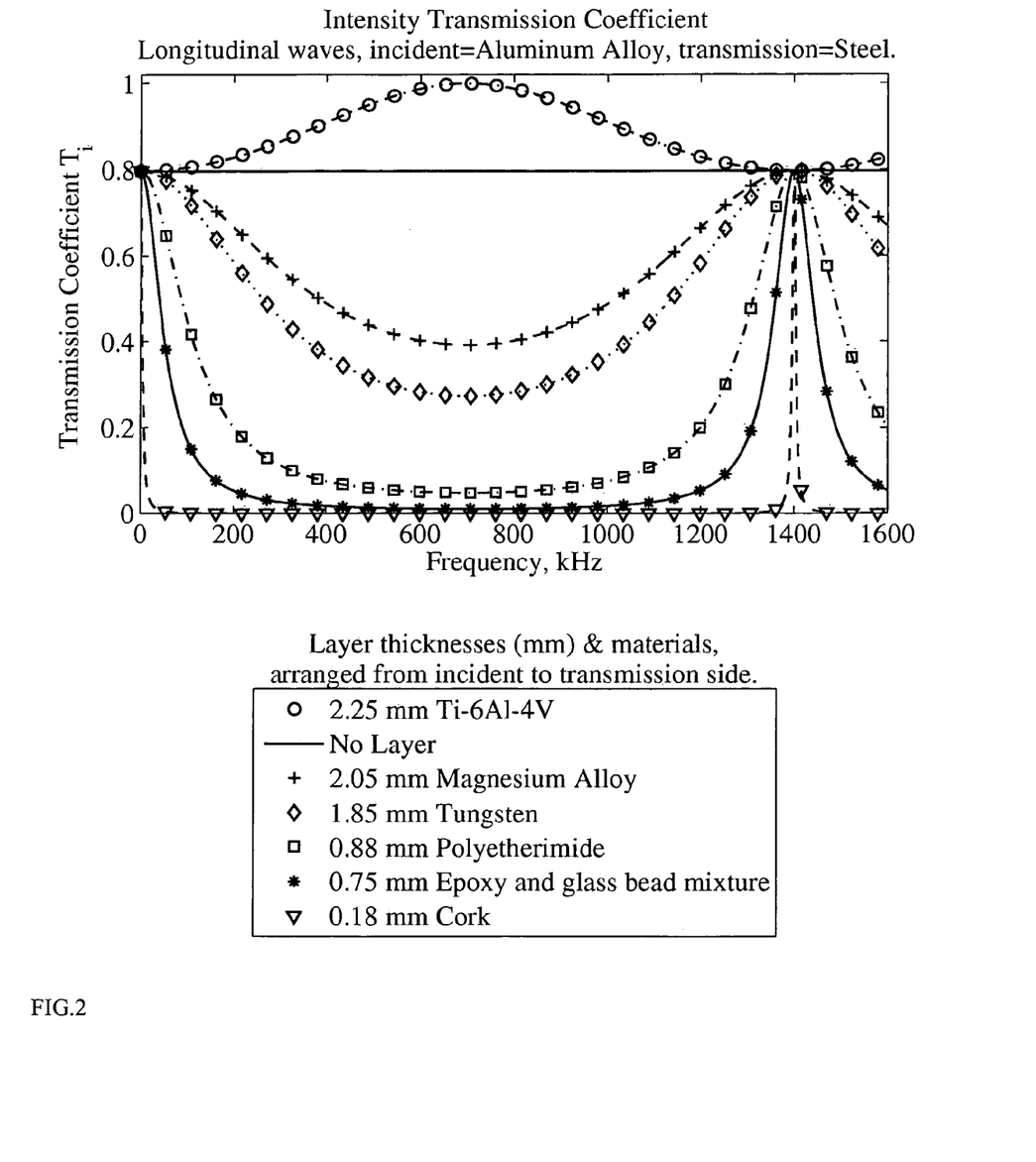
FIG. 2 illustrates predictions of the intensity transmission coefficient for various choices of materials in a specific case of the preferred embodiment of FIG. 1.

A typical embodiment of the invention is to select the layer's thickness so that it is a quarter of a wavelength at $f_c$. In a specific application of this embodiment of the invention, there is a steel-cased accelerometer that should be protected from inputs near its nominal resonance frequency of 700 kHz. The actual resonance frequency depends upon manufacturing parameters and may vary from about 400 kHz to 1200 kHz FIG. 2 summarizes, for different choices of layer materials, the calculated intensity transmission coefficient as a function of frequency for an incident longitudinal wave when the invention consists of a single layer of material with thickness h equal to a quarter-wave length at frequency $f_c=700$ kHz. The mounting surface is assumed to be aluminum, which has a lower impedance than steel. For ease of illustration, the case and mounting surface are considered to be half-spaces.

Notice in FIG. 2 that the titanium alloy Ti-6Al-4V amplifies the transmitted wave. Indeed, because its impedance is very close to the geometric mean of the impedances of the aluminum mounting surface and the steel accelerometer case, harmonic components at the critical frequency $f_c$ are nearly fully transmitted into the accelerometer case without reflection back into the mounting surface.

In FIG. 2, the magnesium alloy blocks transmission of the waves because its impedance is less than that of the aluminum mounting surface, while the tungsten blocks transmission of the waves because its impedance is greater than that of the accelerometer's steel case. The polyetherimide, the mixture of epoxy and glass beads, and the cork all block transmission of the waves because their impedances are lower than that of the aluminum. Other materials, including other metals and polymers, could also be considered.

The use of a single layer of material in the invention results in a periodic transmission coefficient. Whenever the frequency is such that the layer is an odd integral number of quarter wave lengths thick, the layer will attenuate or amplify the transmitted wave, depending upon the layer's characteristic material impedance as compared to the mounting surface and the sensor case. At frequencies for which the layer's thickness is an integral number of half-wave lengths, the wave is transmitted without change in amplitude.

Multiple Layers May be Required to Achieve the Desired Transmission Behavior

Multiple layers of material can be used to alter the transmission behavior for the application of concern. Typical reasons to use multiple layers include increasing the magnitude of attenuation, broadening the frequency range over which attenuation or amplification is achieved, keeping transmission near a constant value over some frequency band, and rolling off the transmission at some desired rate per unit frequency. Multiple layers are required to eliminate the periodic behavior of the transmission coefficient that results from using a single layer of material.

When employing multiple layers, computational methods, including optimization algorithms, prove useful in selecting the layer materials and thicknesses in order to achieve targeted transmission behaviors.

Figure 3:
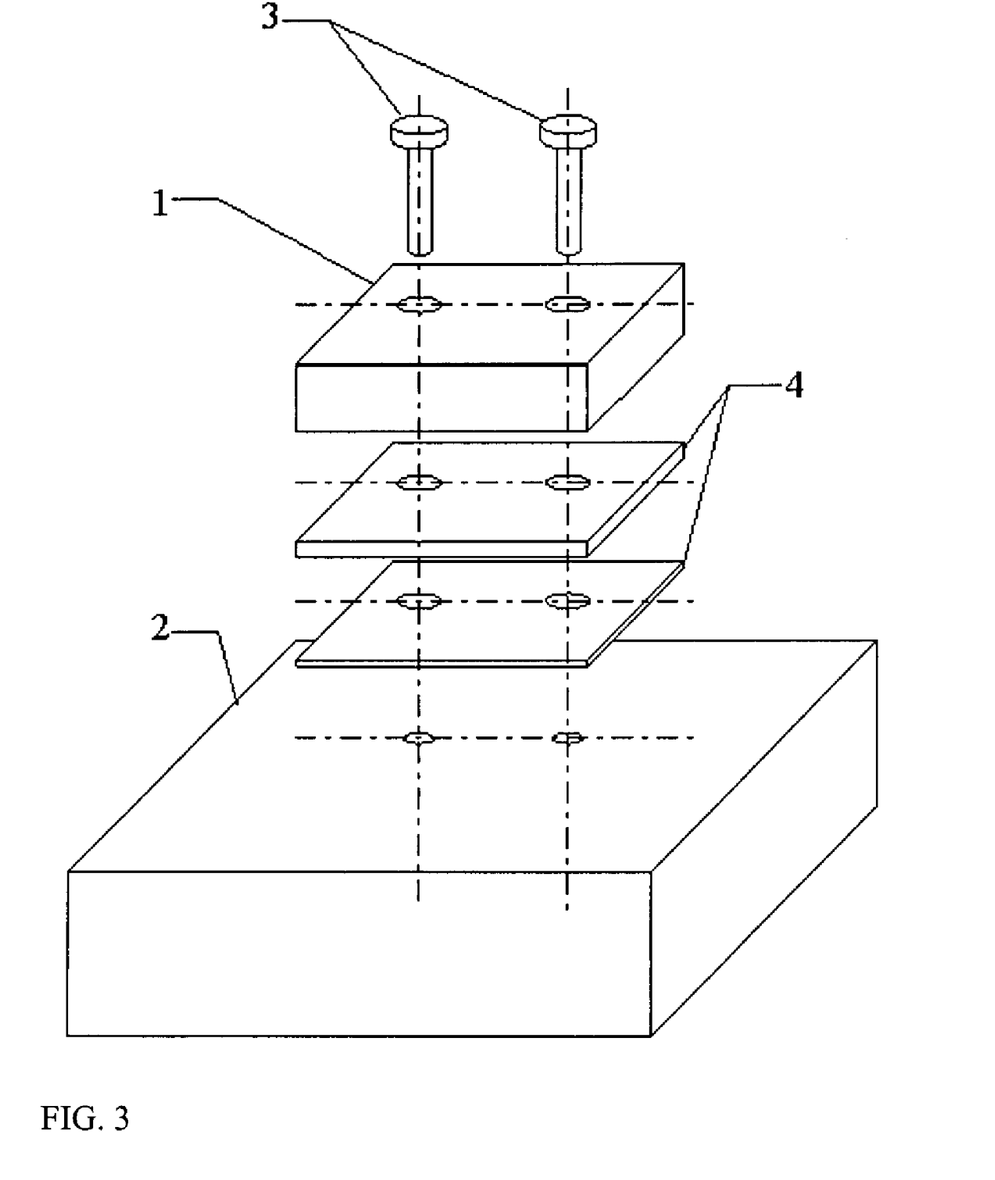
FIG. 3 illustrates a preferred embodiment in which the invention consists of two layers of material between a sensor and a mounting surface.
Figure 4:
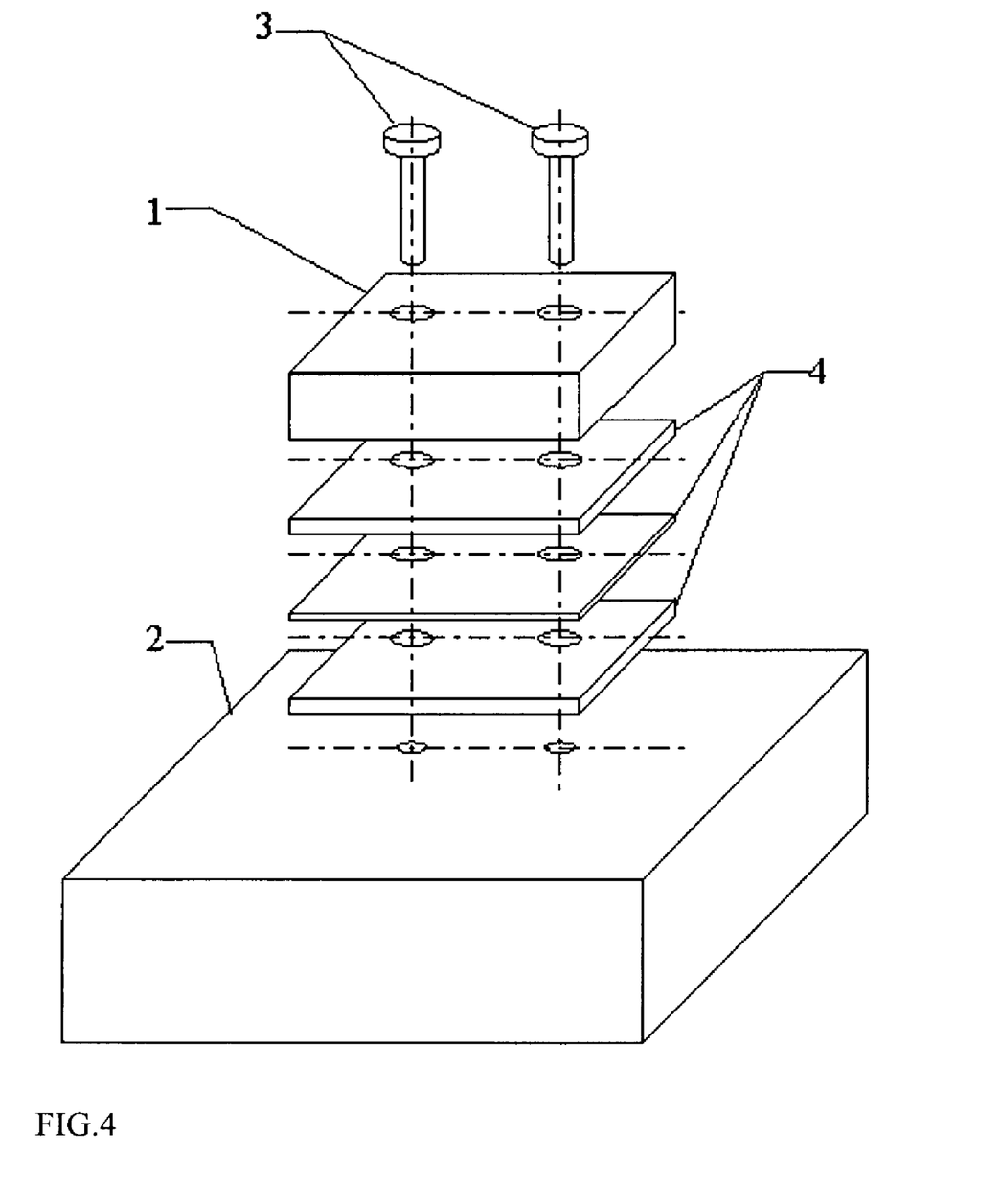
FIG. 4 illustrates a preferred embodiment in which the invention consists of three layers of material between a sensor and a mounting surface.

The embodiment illustrated in FIG. 3, is composed of a two layers of different materials between a sensor and a surface to which it is mounted. Another embodiment, illustrated in FIG. 4, is composed of a three layers of different materials.

Design of a Multi-Layered Embodiment Having Only Metal Layers

In a best mode of the invention, for the previously described accelerometer that should be protected from inputs from about 400 kHz to 1200 kHz, it is desired that all layers of the invention be of metal. Selecting a magnesium alloy and tungsten because of their disparate impedances compared to the aluminum mounting surface and the steel case, FIG. 5 summarizes the calculated intensity transmission coefficient as a function of frequency for an incident longitudinal wave when the invention consists of two or three layers of a magnesium alloy and tungsten.

Figure 5:
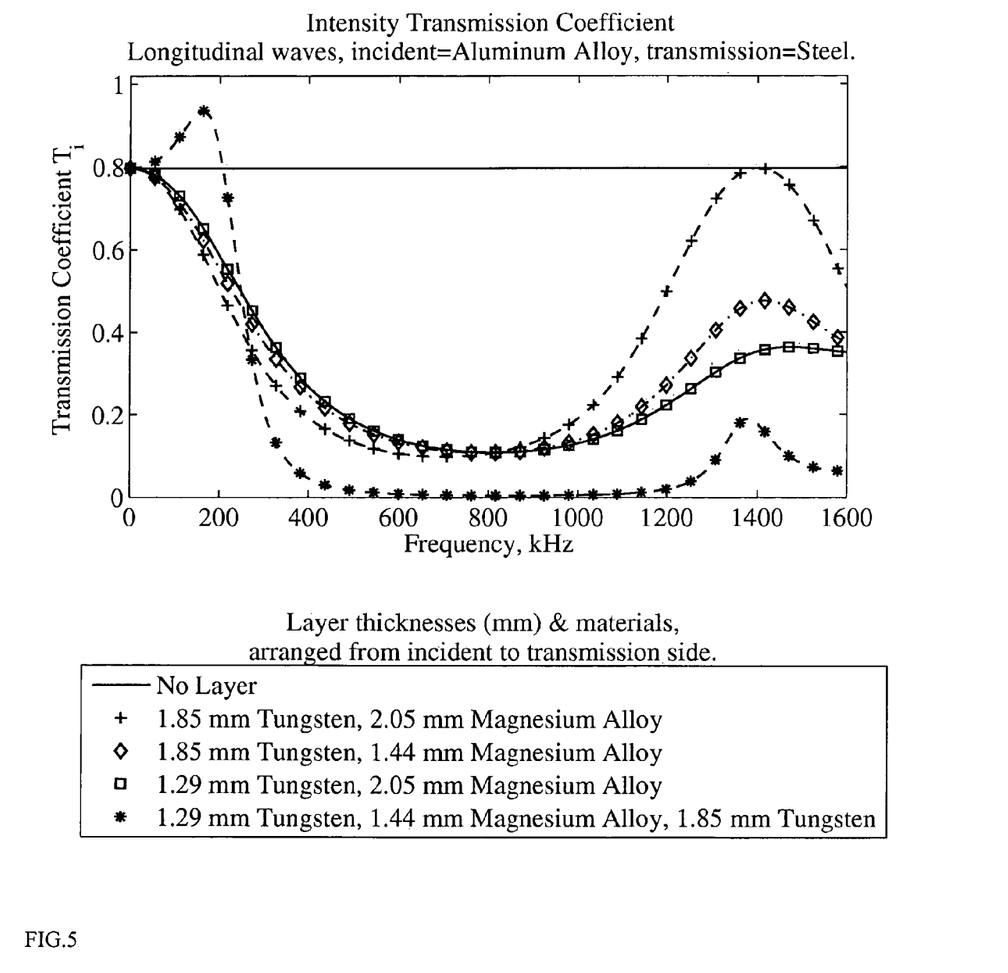
FIG. 5 illustrates predictions representative of those produced while designing a mount of two different metals to protect a particular sensor from resonance near 700 kHz.

FIG. 5 is representative of design iterations that lead to a specific application of a best mode of the invention. An initial design would use a quarter-wave layer of each material for the accelerometer's nominal resonance frequency of $f_c$=700 kHz. This produces a deep stop band at $f=f_c$, but also a pass band at $f=2f_c$, as illustrated by one of the curves in FIG. 5. By varying the thicknesses of each layer, the transmission coefficient can be reduced at this pass band, as shown by two of the curves in FIG. 5. Adding a third layer of metal has additional effects. In the curve shown in FIG. 5 for two layers of the tungsten and one layer of the magnesium alloy, the dimensions have been adjusted to amplify frequencies up to about 200 kHz, to deepen and widen the stop band originally centered at $f_c$=700 kHz, and to reduce the transmission coefficient at what had been the pass band at $f=2f_c$.

Design of a Multi-Layered Embodiment Having Both Metal and Plastic Layers

Figure 6:
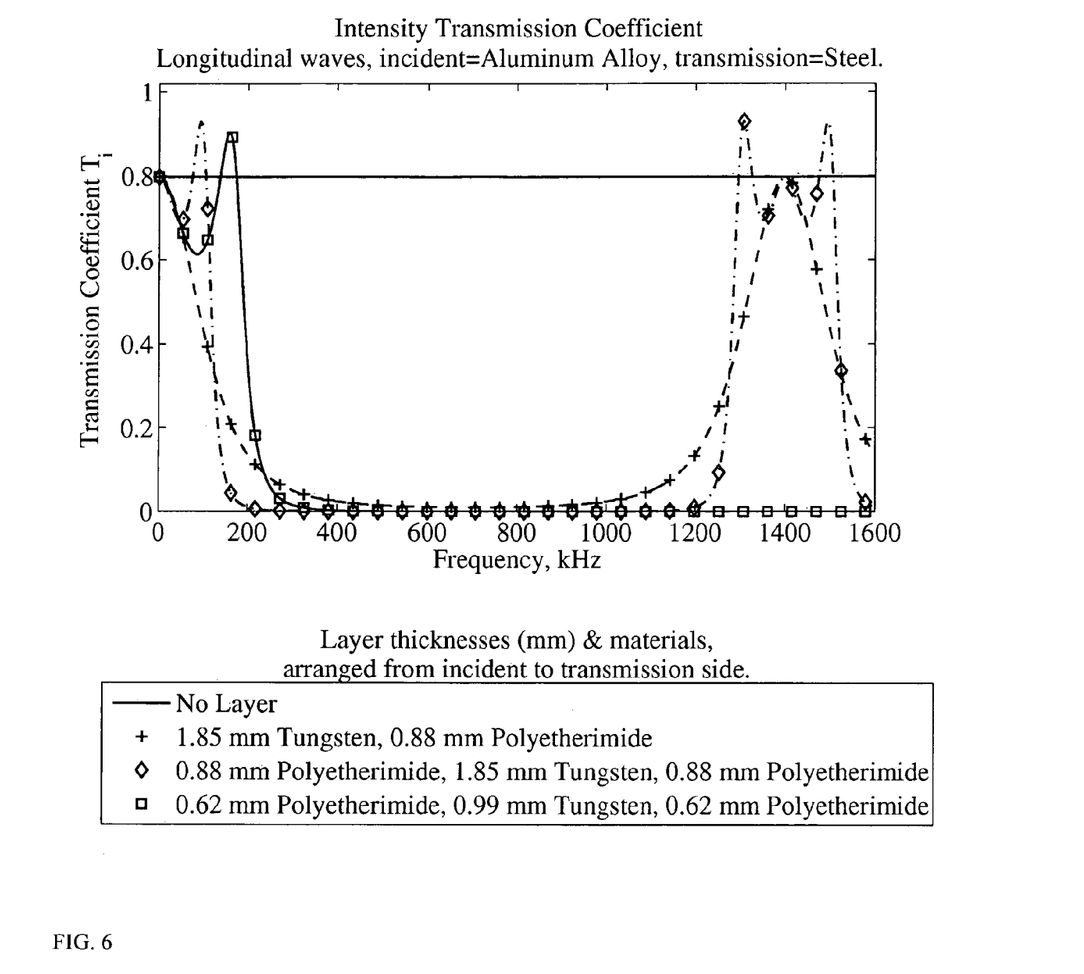
FIG. 6 illustrates predictions representative of those produced while designing a mount of plastic and metal to protect a particular sensor from resonance near 700 kHz.

In another embodiment of the invention, layers of plastic and metal can be used to protect the previously described accelerometer. FIG. 6 summarizes the calculated intensity transmission coefficient as a function of frequency for an incident longitudinal wave when the invention consists of a two or three layers of a hard plastic and tungsten.

FIG. 6 is representative of design iterations that lead to a best mode of the invention for a specific application. An initial design would use one quarter-wave layer of each material for the frequency $f_c$=700 kHz. A third layer, or even more layers, could be added to deepen and widen the stop band, to eliminate the pass-band at $f=2f_c$, or to alter the transmission at lower frequencies transmission. These layer thicknesses can be adjusted to reduce the resulting pass-band at $f=2f_c$. This progression of designs is illustrated by the different curves of FIG. 6.

Alternate Embodiments

In alternate embodiments of the invention, the accelerometer to be protected is one of several similar models in a particular product line. Each of these models has its own range of resonance frequencies, with nominal values from 90 kHz to 1200 kHz. Alternative embodiments of the current invention can be designed to protect each of these models from resonance, using an approach similar to that described for the model with the 700 kHz nominal resonance frequency.

Methods to Reduce the Thickness of the Device

In general, the thickness of the invention depends upon the wave speeds of the materials available for the layers, with low-wave speed materials resulting in thinner layers for a given $f_c$.

Sometimes, the critical frequency of interest is such that quarter wave plates for the frequencies of interest are too thick or heavy for the application. Then thinner layers of various materials can be used with the goal of producing more modest changes in transmission. Computational predictions and optimization methods are particularly useful for designing the device in this situation.

Test Results Demonstrate Effectiveness of Plastic and Metal Embodiment

Impact tests have been conducted that demonstrate the effectiveness of a best mode of the invention. The object of the invention in these tests was to reduce excitation of the sensor's resonance frequency. The sensor of concern in the tests was an accelerometer whose two seismic mass and spring elements have resonance frequencies ranging from about 400 kHz to 1200 kHz, with 700 kHz being the nominal resonance frequency.

Figure 7:
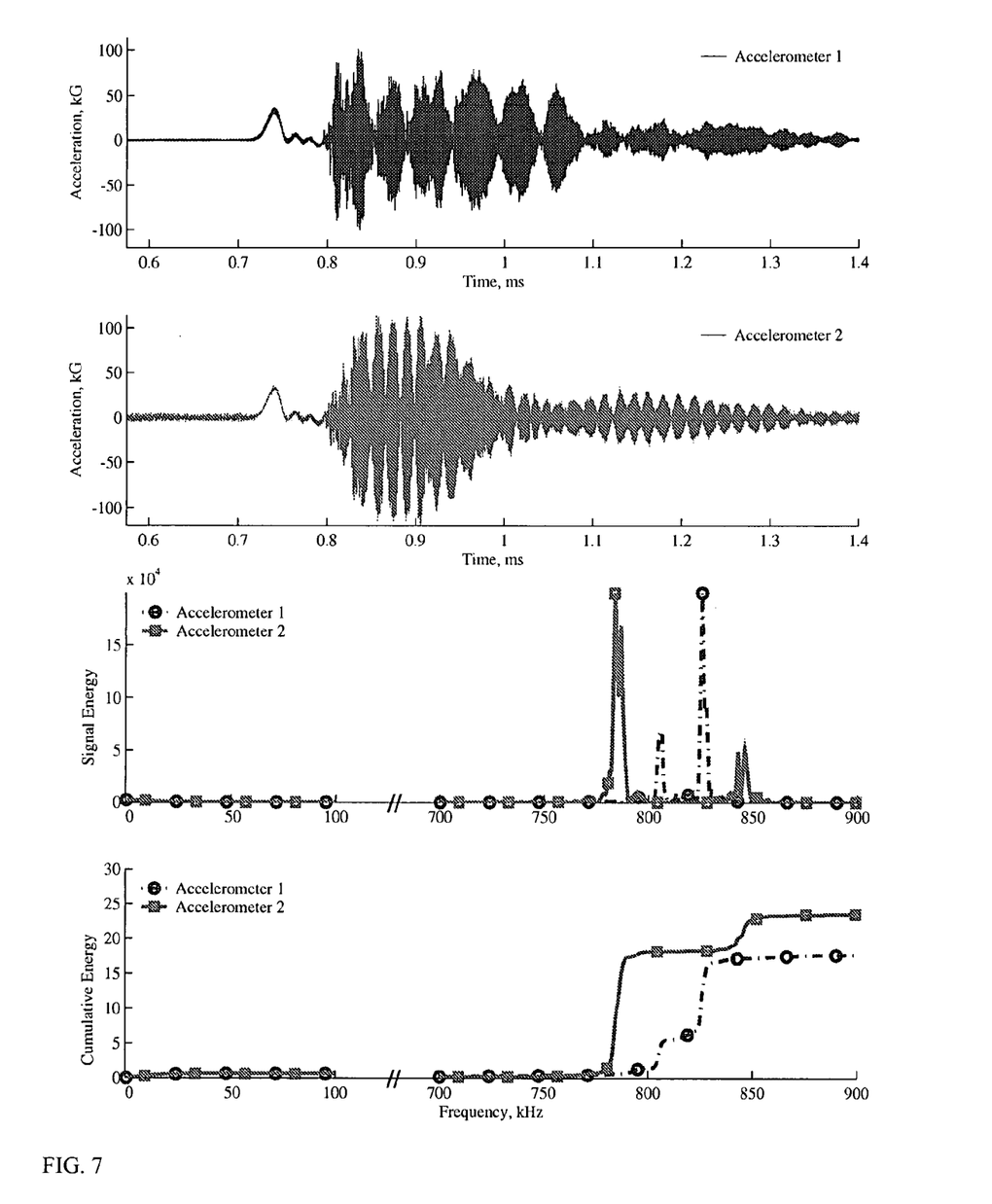
FIG. 7 illustrates the signal outputs of two accelerometers when both are directly attached to a mounting surface in an impact test.

In one test configuration, two accelerometers were mounted adjacent to one another on a mounting surface that was impacted on its opposite side. Typical test results are shown in FIG. 7. The top two frames of this figure show the recorded signals from the two accelerometers. Each accelerometer's voltage output was converted to acceleration in G's, where 1 G=9.8 m/s$^2$. The impact typically produced an initial acceleration pulse with an amplitude of 25 to 50 kG. The peak of this initial pulse occurs at about 0.74 ms in FIG. 7. The accelerometers are in resonance during this initial pulse, but the resonance becomes more apparent in the recording at about 0.8 ms.

The third frame from the top in FIG. 7 shows the signal energy, found by Fourier transform methods. The units are not provided but are identical in all similar figures in this application. The resonance frequencies for each device can be seen at frequencies from about 775 kHz to 850 kHz.

The bottom frame of FIG. 7 shows the cumulative energy for each accelerometer. Again, the units are not provided but are identical in all similar figures in this application. The cumulative energy is plotted for frequencies below 100 kHz, encompassing the manufacturer's state linear response range for this sensor. It is also shown for frequencies from 700 to 900 kHz, encompassing the resonance frequencies for these two accelerometers.

The test was repeated, but with an embodiment of the present invention between the mounting surface and one of the accelerometers. The embodiment presented here was composed of two layers. It was designed as an isolator to block transmission of harmonic waves that would excite the accelerometer's resonance. The layer adjacent to the mounting surface was a 0.75 mm thick tungsten alloy with a nominal density of 16.96 g/cm$^3$. The layer adjacent to the accelerometer was a 0.75 mm thick polyetherimide thermoplastic with a nominal density of 1.28 g/cm$^3$. Cut to a shape that matched that of the accelerometer and with through-holes for the mounting screws, the total mass of the two layers was 1.2 gm. This is considerably less than the 7 grams of the previously mentioned ENDEVCO 7270AM6, which is an isolator used with the same type of accelerometer that we tested.

Figure 8:
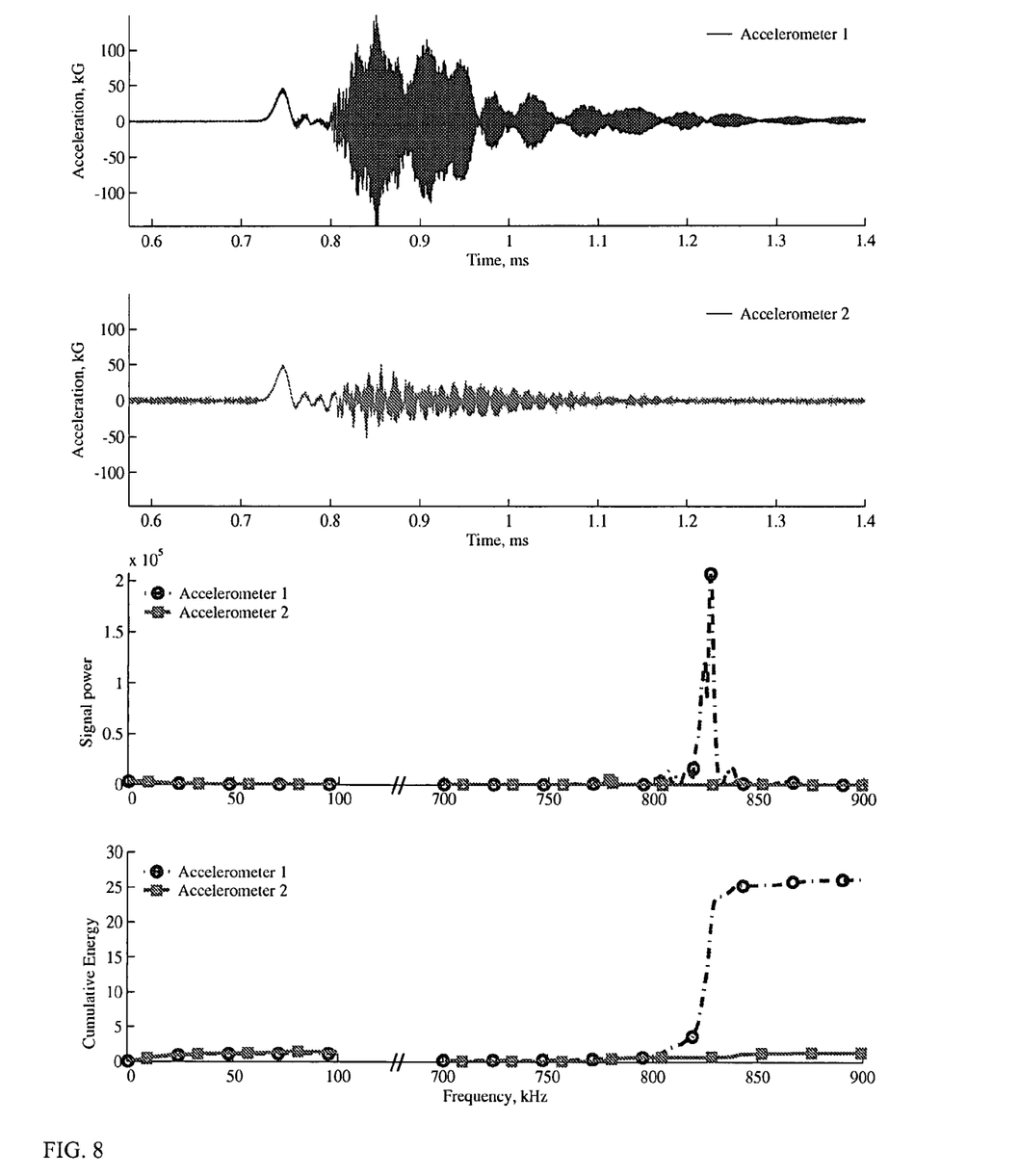
FIG. 8 illustrates the signal outputs of two accelerometers in an impact test when one is directly attached to a mounting surface, and the other is attached with an embodiment of the invention between the accelerometer and the mounting surface.

The results of this test are summarized in FIG. 8. The invention was used with "Accelerometer 2," whose output is shown in the second frame of this figure. The signal outputs from the two accelerometers indicate that the protected "Accelerometer 2" resonated much less severely than the unprotected "Accelerometer 1." The plots of signal energy and cumulative energy indicate that there is much less energy in the resonance of the protected accelerometer than in the resonance of the unprotected accelerometer.

Test Results Demonstrate Effectiveness of all-Metal Embodiment

Impact tests demonstrate the effectiveness of an embodiment of the invention that is made only of metal. These tests used the same type of accelerometer as was used in the previously described tests. Again, the goal was to reduce excitation of the sensor's resonance frequency. The mounting surface and impactor are both very different than were used in the test results presented previously, so that the resulting data does not closely resemble that presented previously.

Figure 9:
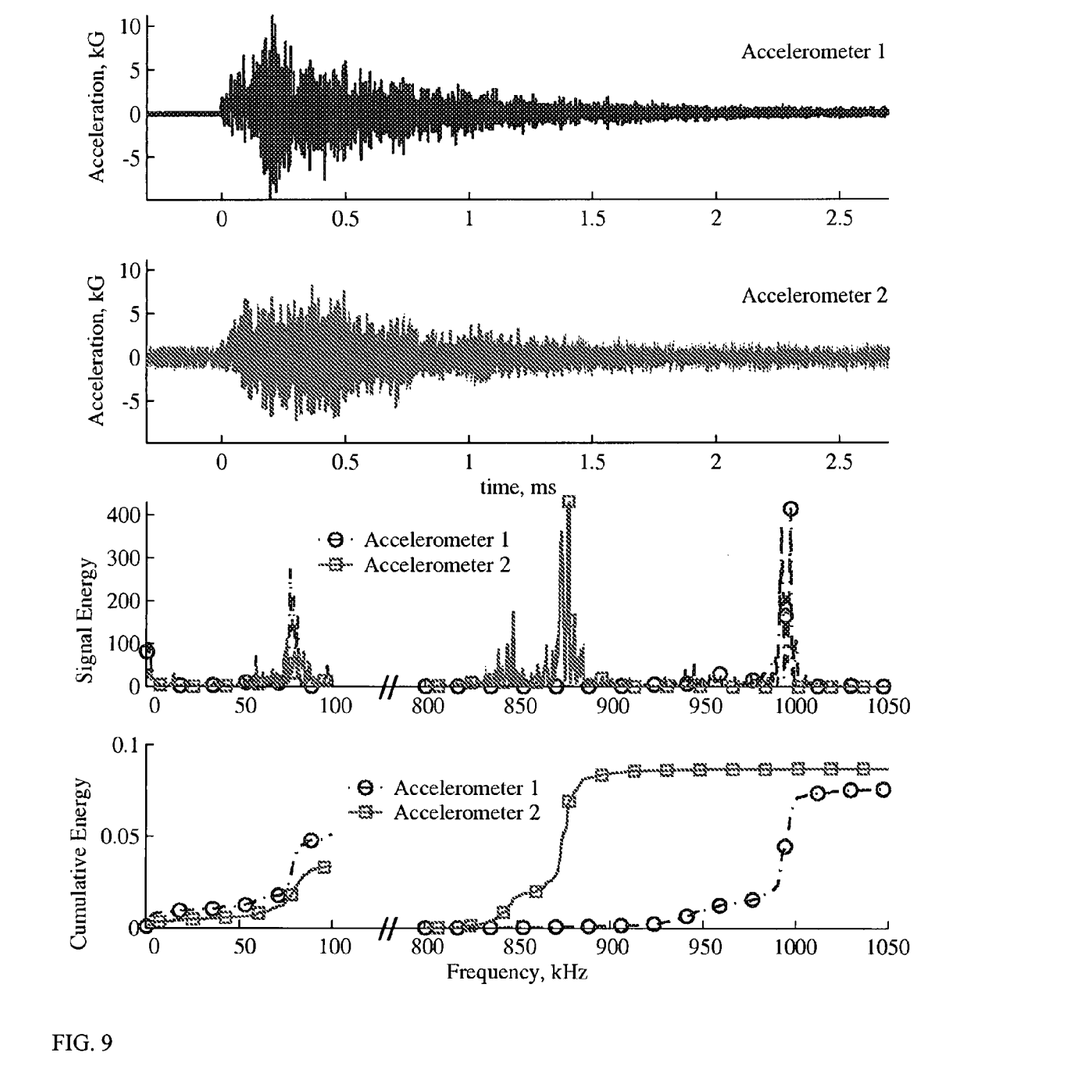
FIG. 9 illustrates the signal outputs of two accelerometers when both are directly attached to a mounting surface in an impact test.

In one test configuration, two accelerometers were mounted adjacent to one another on a mounting surface that was impacted on its opposite side. Typical test results are shown in FIG. 9. The top two frames of this figure show the recorded signals from the two accelerometers. Each accelerometer's voltage output was converted to acceleration in G's, where 1 G=9.8 m/s$^2$.

The third frame from the top in FIG. 9 shows the signal energy, found by Fourier transform methods. The resonance frequencies for each device can be seen at frequencies from about 800 kHz to 1050 kHz. The bottom frame of FIG. 9 shows the cumulative energy for each accelerometer. The cumulative energy is plotted for frequencies below 100 kHz, encompassing the manufacturer's state linear response range for this sensor. It is also shown for frequencies from 800 to 100 kHz, encompassing the resonance frequencies for these two accelerometers.

The test was repeated, but with an embodiment of the present invention between the mounting surface and one of the accelerometers. The embodiment presented here has two layers. It was designed as an isolator to block transmission of harmonic waves that would excite the accelerometer's resonance. The layer adjacent to the mounting surface was a 1.72 mm thick magnesium alloy with a nominal density of 1.77 g/cm$^3$. The layer adjacent to the accelerometer was a 1.7 mm thick tungsten alloy, having a nominal density of 16.96 g/cm$^3$. Cut to a shape that matched that of the accelerometer and with through-holes for the mounting screws, the total mass of the two layers was 2.7 gm. This is considerably less than the 7 grams of the previously mentioned ENDEVCO 7270AM6, which is an isolator used with the same type of accelerometer that we tested.

Figure 10:
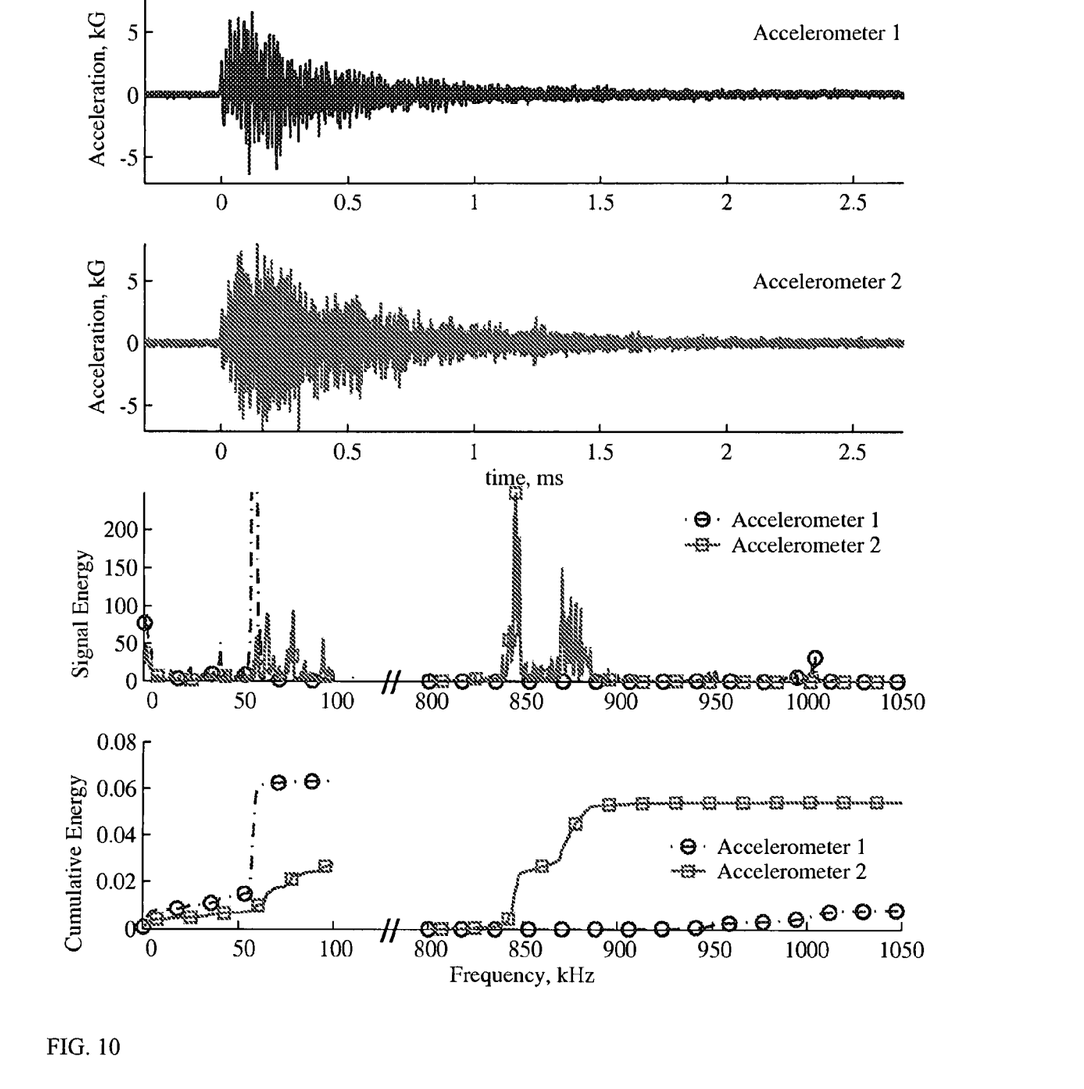
FIG. 10 illustrates the signal outputs of two accelerometers in an impact test when one is directly attached to a mounting surface, and the other is attached with an embodiment of the invention between the accelerometer and the mounting surface.

The results of this test are summarized in FIG. 10. The invention was used with "Accelerometer 1," whose output is shown in the first frame of this figure. The plots of signal energy and cumulative energy indicate that there is much less energy in the resonance of the protected "Accelerometer 1" than in the resonance of the unprotected "Accelerometer 2." The discrepancy in cumulative energy at frequencies below 100 kHz was believed to have been caused by motion of the impacted mounting surface, rather than by any effect of the invention.

What is claimed is:

1. A system for protecting a sensor from mechanical impact or vibration transmitted from a mounting surface, the system comprising a sensor within a case, a mounting surface, and a mechanical filter adjacent to and between the case and the mounting surface, wherein the filter comprises: a layer of material having mechanical impedance dissimilar to those of the sensor case and the mounting surface, such that the effect of the layer is to attenuate the transmission of longitudinal and/or shear waves into the sensor case, and the layer having thickness of approximately h=c/(4f), where c is the wave speed of the material for the type of wave to be attenuated (shear or longitudinal wave), and f is a wave frequency at which maximum wave attenuation is to be achieved.

2. A system according to claim 1 wherein the layer of filter material has mechanical impedance greater than those of both the sensor case and the mounting surface, and f is the frequency at which a stop band is to be centered.

3. A system according to claim 1 wherein the layer of filter material has mechanical impedance lesser than those of both the sensor case and the mounting surface, and f is the frequency at which a stop band is to be centered.

4. A system according to claim 1 wherein the filter layer material is selected from the group of fluids, non-elastomeric polymers, ceramics, metals, and composites of these materials.

5. A system according to claim 1 wherein the filter layer material is an elastomer.

6. A system according to claim 1 wherein the filter layer material comprises cellulosic materials.

7. A system according to claim 1 wherein the filter layer material is selected from the group of composites of elastomers and cellulosic materials.

8. A system for protecting a sensor from mechanical impact or vibration transmitted from a mounting surface, the system comprising:
   a sensor within a case, the sensor having a nominal resonance frequency between approximately 400 kHz and approximately 1200 kHz; and
   a mechanical filter adjacent to and between the case and the mounting surface, wherein the filter comprises: at least two layers, with each layer comprising a material having mechanical impedance dissimilar to that of each adjacent material, wherein the layers attenuate the transmission of longitudinal and/or shear waves into the sensor over a frequency range which includes the nominal resonance frequency.

9. A system according to claim 8 wherein the filter layer materials are selected from the group of fluids, non-elastomeric polymers, ceramics and metals, and composites of these materials.

10. A system according to claim 8 wherein at least one of the filter layer materials is an elastomer.

11. A system according to claim 8 wherein at least one of the filter layer materials comprises cellulosic materials.

12. A system according to claim 8 wherein at least one of the filter layer materials is selected from the group of composites of elastomers and cellulosic materials.

13. A system according to claim 8 wherein at least one layer comprises:
   a material having mechanical impedance greater than the impedance of an adjacent layer and any adjacent sensor case or any adjacent mounting surface; and
   a thickness of approximately h=c/(4f), where c is the wave speed of the material for the type of wave to be attenuated and f is the frequency at which a stop band is to be centered.

14. A system according to claim 8 wherein at least one layer comprises:
   a material having mechanical impedance less than the impedance of an adjacent layer and any adjacent sensor case or any adjacent mounting surface; and
   a thickness of approximately h=c/(4f), where c is the wave speed of the material for the type of wave to be attenuated and f is the frequency at which a stop band is to be centered.

15. A system according to claim 8 wherein the filter defines a wave stop band comprising the frequencies of from approximately 220 kHz to approximately 480 kHz.

16. A system according to claim 8 wherein the filter defines a wave stop band comprising the frequencies of from approximately 400 kHz to approximately 1200 kHz.

17. A system according to claim 8 wherein the filter defines a wave stop band comprising the frequencies of from approximately 800 kHz to approximately 1600 kHz are to be attenuated.

18. A system for isolating a sensor from externally applied impact waves, said impact waves capable of exciting resonance in the sensor comprising:

a mounting surface;

a case;

the sensor within the case; and a filter comprising at least two layers of material disposed between the case and the mounting surface, wherein:

any layer adjacent to the ease comprises material having mechanical impedance dissimilar to the mechanical impedance of the case;

any layer adjacent to the mounting surface comprises material having a mechanical impedance dissimilar to the mechanical impedance of the mounting surface; and at least one layer has a thickness of approximately $h=c/(4f)$, where c is the speed of the waves through the layer material, and where f is approximately the resonance frequency of the sensor, such that the layers attenuate the transmission of waves of frequency f from the mounting surface into the sensor case, thereby substantially isolating the sensor from resonance excitation by externally applied impact waves.

19. A system according to claim 18 wherein at least one layer material has mechanical impedance non-intermediate to the impedances of the mounting surface and the case, respectively.

20. A system according to claim 18 wherein each of the layers comprises a material having mechanical impedance dissimilar to that of any material adjacent thereto.

* * * * *